(12) United States Patent
Hamann et al.

(10) Patent No.: US 11,584,087 B2
(45) Date of Patent: Feb. 21, 2023

(54) METHOD AND DEVICE FOR IMPROVING THE COMPONENT QUALITY OF OBJECTS MANUFACTURED BY AN ADDITIVE MANUFACTURING PROCESS

(71) Applicant: EOS GmbH Electro Optical Systems, Krailling (DE)

(72) Inventors: Joerg Hamann, Ingolstadt (DE); Peter Holfelder, Neufahrn bei Freising (DE); Ludger Huemmeler, Gauting (DE); Manuel Walter, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 192 days.

(21) Appl. No.: 16/982,698

(22) PCT Filed: Apr. 11, 2019

(86) PCT No.: PCT/EP2019/059314
§ 371 (c)(1),
(2) Date: Sep. 21, 2020

(87) PCT Pub. No.: WO2019/197558
PCT Pub. Date: Oct. 17, 2019

(65) Prior Publication Data
US 2021/0001561 A1    Jan. 7, 2021

(30) Foreign Application Priority Data
Apr. 13, 2018   (DE) .......................... 102018205688.9

(51) Int. Cl.
*B29C 64/393*      (2017.01)
*B29C 64/153*      (2017.01)
(Continued)

(52) U.S. Cl.
CPC .......... *B29C 64/393* (2017.08); *B29C 64/153* (2017.08); *B29C 64/205* (2017.08);
(Continued)

(58) Field of Classification Search
CPC .................................................... B29C 64/393
See application file for complete search history.

(56) References Cited

U.S. PATENT DOCUMENTS 5,691,535 A * 11/1997 Boutet ................. G02B 26/101
250/234
5,904,890 A    5/1999 Lohner et al.
(Continued)

FOREIGN PATENT DOCUMENTS

DE    102013011675    1/2015
DE    102015223446    6/2017
(Continued)

OTHER PUBLICATIONS

International Search Report for Application No. PCT/EP2019/059314 dated Aug. 12, 2019, 3 pages.
(Continued)

*Primary Examiner* — Suresh Suryawanshi
(74) *Attorney, Agent, or Firm* — Seyfarth Shaw LLP

(57) ABSTRACT

Disclosed is a method of providing control data for an additive manufacturing device. The method includes accessing computer-based model data of at least a portion of the object to be manufactured, generating at least one data model of a region of a building material layer to be selectively solidified for manufacturing the at least one object portion. The data model specifies solidification of the building material, and the end point of the at least one solidification path a set of energy introduction parameter values is specified which generates a reference value for the radiation power per unit area in the radiation impact area of the beam bundle on the building material which is lower than the reference value for the radiation power per unit area at other locations of the solidification path, and providing control data corresponding to the generated at least one data model for generating a control data set for the additive manufacturing device.

15 Claims, 10 Drawing Sheets

(51) Int. Cl.
*B29C 64/268* (2017.01)
*B29C 64/205* (2017.01)
*B33Y 10/00* (2015.01)
*B33Y 30/00* (2015.01)
*B33Y 50/02* (2015.01)

(52) U.S. Cl.
CPC .............. *B29C 64/268* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 6,085,122 A | 7/2000 | Manning |
| 2004/0182836 A1 | 9/2004 | Becker et al. |
| 2016/0167131 A1* | 6/2016 | Weilhammer .......... B28B 1/001 264/401 |
| 2016/0279872 A1* | 9/2016 | Paternoster ............. B29C 64/40 |
| 2017/0320168 A1 | 11/2017 | Martinsen |
| 2018/0272466 A1 | 9/2018 | Roos et al. |
| 2020/0023578 A1* | 1/2020 | Edelhäuser ............. B22F 10/20 |

FOREIGN PATENT DOCUMENTS

| | | | |
|---|---|---|---|
| EP | 0821647 | 2/1998 | |
| EP | 2667987 | 12/2013 | |
| EP | 2893994 | 7/2015 | |
| EP | 3083203 | 10/2016 | |
| EP | 3083203 A1 * | 10/2016 | ............ B22F 3/1055 |
| WO | 9730836 | 8/1997 | |
| WO | 2012102655 | 8/2012 | |
| WO | 2015091875 | 6/2015 | |

OTHER PUBLICATIONS

Ho Yeoung et al: "Laser Path Planning and Power Control Strategies for Power bed Fusion Systems," Aug. 2016, 16 pages.

* cited by examiner

METHOD AND DEVICE FOR IMPROVING THE COMPONENT QUALITY OF OBJECTS MANUFACTURED BY AN ADDITIVE MANUFACTURING PROCESS

TECHNICAL FIELD OF THE INVENTION

The present application relates to a method and a device for providing control data for an additive manufacturing device, a correspondingly adapted additive manufacturing method, a corresponding device for controlling energy introduction devices of an additive manufacturing device, a correspondingly adapted additive manufacturing device and a correspondingly adapted computer program. In particular, the component quality of the manufactured objects is to be improved thereby.

BACKGROUND OF THE INVENTION

In the field of laser beam welding it is known that a crater may form at the end of a welding path at the location where the laser beam is switched off (see for example US 2004/0182836 A1). The crater may lead to reduced stability, i.e. poorer adhesion between the two parts welded together. The present invention concerns the problem that, even in the field of selective laser sintering or melting, the structure of a manufactured object may be adversely affected if the laser beam is abruptly switched off. This behavior is astonishing and not fully understood, especially since laser beam sintering or melting is a completely different process than laser beam welding.

Whereas laser beam welding is usually used for joining two metal sheets together, selective laser sintering or selective laser melting is used to convert a powdery material into a solid by successively melting layers of material. While in laser beam welding the crater is in theory created by the molten material cooling so quickly that the melt may no longer be able to fill the crater, the problem should not be present in selective laser beam sintering or laser beam melting, because a crater created during the melting of one layer is filled by the application of the following layer of powdery material. The deep welding process frequently used in selective laser beam sintering or laser beam melting usually produces a depth extension of the melt pool generated by a laser beam that is greater than the depth extension ("layer thickness") of the last applied powder layer, for example, twice or three times as great. A number of layers already selectively solidified and arranged underneath the layer currently to be selectively solidified are thus at least partially melted again, so that any crater in the layer immediately underneath may not only be filled with solid material (solidified melt), but the structure may be formed anew.

FIG. 10 shows the usual procedure for the additive manufacturing of objects by irradiating them with electromagnetic radiation or particle radiation (e.g. laser sintering (SLS or DMLS) or laser melting or electron beam melting). In FIG. 10, an object cross section 50 is divided into an inner area or core area 52 and a contour area 51, wherein different parameters for the energy introduction into the building material are usually assigned to the contour area 51 than to the inner area 52. For example, the contour area 51 is scanned with a laser beam as an example of a beam bundle in such a way that the laser beam is moved along the course of the contour. The inner area 52 is usually solidified in such a way that the inner area 52 is divided into partial areas 53, which usually have an approximately rectangular or square shape. The inner area 52 is then scanned partial area by partial area using the laser beam.

As shown in FIG. 10, the laser beam is displaced in parallel paths (scan lines) 54 across the building material in each partial area 53, resulting in a hatch-like displacement pattern when scanning each partial area 53 with the laser beam. In FIG. 10 the direction of displacement of the laser beam is illustrated by arrows. It can be seen that the directions of displacement for adjacent scan lines 54 are opposite to each other.

FIG. 11 illustrates how such a displacement pattern of the laser beam may be achieved. In FIG. 11, the laser beam enters the area 53 in the upper left corner and scans the building material in area 53 along the uppermost scan line 54. At the end of the scan line, i.e. when the laser beam has reached the edge of the partial area 53, the laser beam is switched off and the direction of movement of the laser beam is changed within the turning area 55 without supplying radiation to the building material so that the laser beam may then be moved along the second uppermost scan line 54 in the opposite direction of movement across the building material in the partial area 53. Following this displacement pattern, the entire partial area 53 is then scanned, as illustrated in FIG. 11.

Even though for obtaining homogeneous, uniform components, the aforementioned approach is generally followed, the inventors have found that the described procedure may nevertheless result in component inhomogeneities at the turning areas 55.

SUMMARY OF THE INVENTION

The object of the present invention is therefore to provide a method and a device by means of which the component homogeneity of objects manufactured by an additive manufacturing process can be improved.

The object is achieved by a computer-aided method according to claim 1, an additive manufacturing device according to claim 11, a device for providing control data according to claim 12, a device according to claim 13, an additive manufacturing device according to claim 14 and a computer program according to claim 15. Further developments of the invention are claimed in the dependent claims. In particular, a device according to the invention may also be further developed by features of the methods according to the invention as set out below or in the dependent claims and vice versa. Furthermore, the features described in connection with a device according to the invention can also be used for further development of another device according to the invention, even if this is not explicitly stated.

A computer-aided method according to the invention for providing control data to an additive manufacturing device for manufacturing a three-dimensional object, wherein the object is manufactured by means of the additive manufacturing device by applying a building material layer by layer and by solidifying the building material by supplying radiation energy to locations in each layer corresponding to the cross-section of the object in that layer by scanning those locations with at least one beam bundle according to a set of energy introduction parameter values along a number of solidification paths, comprises:

a first step of accessing computer-based model data of at least a portion of the object to be manufactured, a second step of generating at least one data model of a region of a building material layer to be selectively solidified for manufacturing said at least one object portion, wherein in said data model a solidification of said building material by displacing at least one beam bundle along at least one solidification path is specified wherein for the end point of the at least one solidification path a set of energy introduction parameter values is specified which generates a reference value for the radiation power per unit area in the radiation impact area of the beam bundle on the building material which is lower than the reference value for the radiation power per unit area at other locations of the solidification path, and a third step in which control data corresponding to the at least one data model generated in the second step are provided for the generation of a control data set for the additive manufacturing device.

Additive manufacturing devices and methods to which the present invention relates are in particular those in which energy is selectively supplied as electromagnetic radiation or particle radiation to a layer of the building material. The working plane is a plane in which the top surface of the layer to which the energy is applied is located. The energy introduction device may, for example, include a laser or an electron beam source. In particular, the invention relates to processes and devices in which heat is supplied to the building material by means of radiation, such as laser sintering or laser melting or electron beam melting.

An application of the invention in connection with additive manufacturing processes and devices in which a metal or at least a metal-containing building material is used, for example a metal powder or a metal alloy powder, is of particular advantage.

It should also be noted here that by means of an additive manufacturing device according to the invention not only one object but also several objects may be manufactured simultaneously. When the present application refers to the manufacturing of an object, it is understood that the description in question is equally applicable to additive manufacturing processes and devices in which several objects are manufactured simultaneously.

In this context, a control data set (often referred to as a control instruction set) is meant to be a sequence of instructions to apply layers of building material in sequence and to scan regions of the respective layers corresponding to the cross-section of an object to be manufactured with radiation in order to solidify the building material.

In detail, a control data set is based on a computer-based model of the object(s) to be manufactured, preferably a CAD model. The control data set defines for each layer during manufacturing the locations where radiation is to cause a solidification of the building material and optionally the thickness of the layer. Further, a control data set often also contains information specific to the manufacturing device, for example with respect to the position and orientation of the objects in the additive manufacturing device or with respect to a diameter of a radiation impact area of a beam (bundle) when impinging on the building material. As a rule, the control data set contains all the data required for controlling the energy introduction device, whereby, among other things, the energy density of the radiation, i.e. the energy per unit area, and/or the travel speed of the beam bundle across the building material and/or an irradiation pattern are determined. Here the term "beam bundle" is used instead of "beam" to express that the diameter of the radiation impact area on the building material does not necessarily have to be very small, but may also cover a larger area, especially if the radiation impinges obliquely on the building material or if radiation is used which is deliberately intended to cover a larger area when impinging on the building material (for example, if a line exposer is used).

The control data set may thus be considered as the entirety of all the control data specified for the control of the manufacturing process in an additive manufacturing device. The control data related to a single layer are also referred to as layer data set in the following. In the present application it is assumed in particular that a layer data set contains a data model of locations of an object cross-section to be solidified during the manufacturing process. Such a data model is usually created by slicing a CAD model of the object to be manufactured into layers (in technical jargon called slicing). However, it is also possible to extract a two-dimensional representation of the object cross-section to be solidified in one layer by means of one or more beam bundles in another way from the computer-based CAD model of the object. In the layer data set, locations corresponding to an object cross-section are specified which are to be solidified in the corresponding building material layer. In addition, further information regarding the manufacturing of the object cross-section may also be included, in particular the time sequence in which locations corresponding to an object cross-section are to be solidified, i.e. a scan line or a scanning track along which solidification is to take place, or e.g. the layer thickness or irradiation parameter values, such as the diameter or the travel speed of a radiation impact area of a beam bundle impinging on the building material, etc. It should be emphasized that there are also special cases in which a layer data set does not refer to a complete object cross-section, but only to a part of it.

The computer-based model data may, for example, be a model of the object section to be manufactured, which is available, for example, as a CAD model or converted into the STL format, and does not yet contain information on the decomposition into layers for layer-by-layer manufacturing. It is also conceivable that the model data is available in a GML (Generative Modelling Language) description. Alternatively, it may be thought of a number of layer data sets, each of which contains a data model of a region of a building material layer to be selectively solidified during manufacturing, which corresponds to a cross-section of the object section. It should be noted here that in the present application the term "number" is always to be understood in the sense of "one or more". It should also be noted that the object section need not necessarily relate to only a part of the object to be manufactured, but may also include the entire object to be manufactured.

Access to the model data may involve reading the model data from a memory or receiving it via a network. The model data of the entire object section do not necessarily have to be read in at once. It is also possible that there is a greater time distance between the access processes to parts of the model data, for example parts of the model data may be read in from a memory (which may also be accessed by the additive manufacturing device) or via a network as required during a manufacturing process of the object section, and a generated data model is then integrated into the control data set during the manufacturing process. An additive manufacturing device may therefore itself modify the control data set for its control on the basis of the method according to the invention.

If the model data accessed in the first step already contains a number of layer data records, then the generation of at least one data model in the second step may consist in the modification of a data model of a building material layer already contained in the model data. Otherwise, a data model of a building material layer (or part of it) may be generated for the first time in the second step.

A solidification path corresponds to a line segment in the working plane along which the building material is to be solidified without interruptions in time and space, i.e. in one go or, in other words, by continuously displacing the melt pool in a direction parallel to the building plane. In particular, solidification paths may be regarded as those scan line(s) (section(s)) where the scanning of the building material by the at least one beam bundle actually causes solidification of the material and not only heating of it. For example, a solidification path may be a straight line segment of a certain width along which the building material is solidified by scanning with a radiation impact area. However, there are also cases in which one or more changes of direction occur when a radiation impact area is displaced along the solidification path, in particular the solidification path is geometrically a curved line of a certain width.

In the data model generated in the second step, the energy introduction parameter values are specified for the radiation impact area of that at least one beam bundle the action of which on the building material causes solidification of at least one uppermost layer of the building material, i.e. which does not merely preheat or postheat the building material.

Preferably, exactly one beam bundle is used to solidify the building material along a solidification path. As a result of the energy supplied by the beam bundle when scanning the building material, the latter is partially or completely melted, which causes the components of the building material (e.g. powder grains) to bond together. After cooling, the building material is then available as a solid.

It should be mentioned that there may be building materials, such as alloys, for which no clear melting point but a melting interval is defined. In principle, in such a case one may speak of partial melting already when the solidus temperature, i.e. the lower limit of the melting interval, is exceeded. However, the present invention can preferably be applied to cases in which the building material is completely melted, i.e. the liquidus temperature or the upper limit of the melting interval is exceeded.

Since the transitions between partial (i.e. superficial in the case of powder grains) melting (liquid phase sintering) and complete melting (melting) are fluid, the terms sintering and melting are used synonymously in the present application and no distinction is made between sintering and melting.

In the case of solidifying the building material along a solidification path using more than one beam bundle, the joint action of several beam bundles partially or completely melts the building material, causing the components of the building material (e.g. powder grains) to combine with each other. Here, too, the building material is solidified along the solidification path without any interruptions in time, i.e. in one go. For example, if two beam bundles are used, one of the beam bundles may solidify an initial section of the solidification path on its own and the other beam bundle may be added only at some distance from the initial point. The two beam bundles would then simultaneously introduce energy into the built-up material for a certain line segment of the solidification path, wherein their incidence areas overlap at least partially. At some distance from the end point, the second beam bundle may be switched off again, so that the end section would be solidified again by the first beam bundle only. This procedure is an example of a special form of implementation of the invention, in which the joint energy introduction of two or more beam bundles in the middle section of a solidification path ensures that a higher reference value of radiation power per unit area is supplied to the building material there. For example, a constant reference value of the radiation power per unit area may be specified within the central section, which is higher than that at the starting or end point where fewer beam bundles than in the central section or only one beam bundle introduces energy. The mid-section of the solidification path is defined as a section of the solidification path that lies between the starting point and the end point of the solidification path with respect to the direction in which the solidification path is scanned.

The length of a solidification path corresponds, for example, to the width of a partial area (often stripe-shaped or rectangular) of a cross-section of the object to be solidified. If an object cross section is solidified by means of a beam bundle in the form of a hatch pattern, such solidification paths are also called "hatch lines". In particular, the length of a solidification path may also correspond to the diameter of the object cross-section in the direction of the course of the hatch lines, wherein the width of a contour line framing the cross-section may have to be subtracted from this diameter. Alternatively, the length of a solidification path may also correspond to the distance between the edge of a (often rectangular or square) partial area of an object cross section to be solidified and the edge of the object cross section or the contour line.

When speaking of a starting point or an end point of a solidification path, then not a point without extension is meant, but a section at the beginning or end of a solidification path, the extension of which corresponds to that partial area of the incidence area of a beam bundle, within which solidification is caused. Such a partial area is regarded as a radiation impact area. Typically, locations of the building material to be irradiated are coded in the control data for controlling the at least one beam bundle as points within a coordinate system, which may be defined two-dimensionally (in relation to a layer) and/or three-dimensionally (in relation to a construction volume of the manufacturing device, i.e. to a plurality of layers). However, information about a respective extension of the radiation impact area of the beam bundle may be linked to these points. In a data room for the preparation of a manufacturing process, a starting point and/or an end point of a solidification path may be mathematical points, but not in an actual manufacturing process. The direction of a scanning or solidifying of the solidification path by the at least one beam bundle usually runs from the starting point to the end point.

A radiation impact area of a beam bundle on the building material may be regarded as an area of the working plane within which the incident radiation power per unit area is greater than a predetermined percentage of the maximum radiation power per unit area, wherein exceeding the predetermined percentage of the maximum radiation power per unit area results in exceeding a melting temperature or solidus and/or liquidus temperature of the building material. Within the radiation impact area, laser radiation or particle radiation, for example, may act on the building material. The predetermined percentage or the shape and size of the radiation impact area may be determined either by previous manufacturing processes with the additive manufacturing device and/or with the building material, or by preliminary tests in which test irradiations are carried out.

A radiation impact area on the building material does not necessarily have to be circular, but may also have other shapes, e.g. oval, especially if the radiation is incident at an angle on the building material or if radiation is used which is deliberately intended to cover a larger area when impinging on the building material (e.g. if a line exposer is used).

In particular, a radiation power per unit area may be deliberately varied within the radiation impact area.

As a reference value for the radiation power per unit area in the radiation impact area, the output power of the radiation source used to generate the beam bundle (e.g. a (pump) laser source) may serve as a reference value while directing the beam bundle onto the radiation impact area. Examples of other possible reference values are the average radiation intensity in the beam bundle, the maximum radiation intensity in the beam bundle, the total radiation power in the beam bundle, the integral radiation power per unit area in the radiation incidence area, or a quantity calculated from various radiometric basic quantities.

Especially if the radiation power per unit area varies within the radiation impact area, the maximum radiation power per unit area within the radiation impact area may also be used as a reference value, since a maximum may be determined for each local distribution of radiation power per unit area. For example, if there is a constant value of radiation power per unit area within the radiation impact area, the maximum is the value of radiation power per unit area at each location. Alternatively, an average value of the radiation power per unit area within the radiation impact area may be selected as a reference value.

It is irrelevant to the idea of the present invention what is used as a reference value for the radiation power per unit area within the radiation impact area. Essentially, the only important thing when determining the reference value of the radiation power per unit area in the radiation incidence area is that the reference value is positively correlated with the radiation power per unit area at a position within the radiation incidence area, i.e. it increases monotonically with the radiation power per unit area in the radiation incidence area.

If energy introduction parameter values corresponding to a reference value for radiation power per unit area are specified, this may be done in several ways. First, a specified energy introduction parameter may be the reference value itself. For example, a value of the output power of the radiation source used to generate the beam bundle (e.g. a (pump) laser source) may be specified. It is also possible to specify values of energy introduction parameters which are not the reference value but which influence the reference value. An example would be the specification of the local distribution of the radiation intensity per unit area within the radiation impact area, for example by specifying the focusing, i.e. the position of the focus in a direction perpendicular to the building plane.

How a reference value changes when the radiation power per unit area changes at a position in the radiation incidence area may be determined in advance for the additive manufacturing device for which control data are to be provided, e.g. by examining a beam profile or an intensity distribution of the beam bundle, by directly measuring the radiation power per unit area (e.g. by means of an IR camera or a sensor mounted near the building plane), etc. If the relationship between the reference value and the radiation power per unit area is already known from previous manufacturing processes using the additive manufacturing device and/or using the building material, the above-mentioned preliminary investigations may also be dispensed with.

When scanning a solidification path with only one beam bundle, the width of the solidification path is defined as the extension of the radiation impact area perpendicular to the direction of movement of the beam. Where within a solidification path several beam bundles together cause a solidification of the building material, the width of the solidification path may be defined by the intersection of the extensions of the radiation impact areas perpendicular to the direction of movement of the beam bundles along the solidification path. Alternatively, the beam bundle with the largest extension of the radiation impact area perpendicular to the direction of movement of the beam along the solidification path may also define the width of the solidification path.

The invention may provide control data for additive manufacturing of objects with improved homogeneity in an additive manufacturing device. With reference to the example in FIG. 11, this may be explained as follows:

Whereas at the end point of a solidification path a solidification of the building material is to take place, no solidification is to take place in the turning region 55 immediately adjacent to it. For this purpose, the laser beam is switched off in the turning region 55. However, this may lead to undesired inhomogeneities in the object or component at one end of a solidification path, the cause of which is an abrupt change in the laser parameters, especially the power density, i.e. the radiation power per unit area. Due to the reduction of the reference value for the radiation power per unit area at the end point according to the invention, the change in the power density at these locations is smaller, whereby temperature inhomogeneities which may lead, for example, to structural inhomogeneities in the microstructure of the finished object or component are reduced. The reference value for radiation power per unit area specified at other locations on the solidification path is higher than at the start and/or end point. Temperature inhomogeneities at these other locations do not have to be taken into account as much. Of course, the reduction of the reference value for radiation power per unit area does not have to be limited to the end point, but may also include other locations of the solidification path, but not all locations of the same.

It should also be noted that the control data provided for the generation of a control data set may consist of the at least one data model itself generated in the second step, but the at least one data model may also be prepared for integration into the control data set according to any format requirements.

Preferably, the reference value for the radiation power per unit area in the radiation impact area on the building material at the end point of a solidification path is less than or equal to 50%, preferably less than or equal to 20%, even more preferably less than or equal to 10%, even more preferably less than or equal to 5%, even more preferably maximally 3%, even more preferably maximally 2% of the reference value for the radiation power per unit area at the other locations of the solidification path.

The higher the percentage differences are, the more positive the effect on the object homogeneity may be.

Further preferably, the energy introduction parameter values in the radiation impact area at the end point of a solidification path are defined in such a way that a heat conduction welding process takes place when the radiation acts on the building material, wherein a deep penetration welding process takes place at least at one other location of the solidification path when the radiation acts on the building material.

In this context, a deep welding process is considered to be a process in which the radiation power per unit area introduced into the building material by the radiation is so high that all the main components of the building material evaporate, wherein, for example, if dedicated non-melting reinforcing particles or reinforcing fibres are used, these are not considered to be main components. As a result of the formation of a vapor capillary on the surface of the building material, the beam bundle penetrates deeper under the surface of the layer to be solidified. This may lead to a multiple reflection of the beam bundle, which improves the absorption of radiation.

A heat conduction welding process in this case is considered to be a process in which the radiation power per unit area introduced into the building material by the radiation is too low to cause the building material to evaporate. The energy spreads across the building material by thermal conduction, which results in a smaller expansion of the melt pool generated by the radiation perpendicular to the surface.

The inventors have found that it has a positive effect on the object homogeneity in the region of the end of the solidification path if a transition to a heat conduction welding process takes place at the end of the solidification path. They explain this by the fact that the material evaporation present in a deep welding process may lead to craters in the solidified building material. This may occur in particular if, at the end of a solidification path, the radiation power per unit area is reduced too abruptly to such an extent that the energy introduction per unit area falls below the energy per unit area required to melt the building material (e.g. by switching off the beam bundle). As a result of the rapid solidification process of the melted building material, the temporarily formed vapour capillary, also called "keyhole", in the solidified object may no longer be filled with material.

The solution proposed is therefore to specify energy introduction parameter values, especially at the end point of a solidification path, which cause a heat conduction welding process when the radiation impinges onto the building material. Which energy introduction parameter values are suitable for this may have been determined in preliminary tests for the building material to be used. During the preliminary tests, the output power of the radiation source used to generate the beam bundle, the local distribution of the radiation intensity per unit area within the radiation impact area, the speed of movement of the radiation impact area in the working plane or, e.g., the focusing depth of the radiation with respect to the working plane may be varied.

The examination of the type of welding process may be determined, for example, by observation of the radiation impact area by means of a camera (optical, IR, UV), by analysis of the radiation emitted by the radiation impact area or by analyses of test objects manufactured during preliminary tests. The criterion for the presence of a heat conduction welding process may be the substantial absence of emissions caused by the vapour capillary generated during the deep penetration welding process, i.e. spatters or jets as well as metal vapour. A further criterion is the aspect ratio of the melt pool (diameter of the melt pool parallel to the working plane in relation to the depth, i.e. perpendicular to the working plane), which is above 1:1 in the case of heat conduction welding, ideally about 2:1, in any case below 100:1, and/or the surface temperature of the building material. If the latter is below the evaporation point of one or all the components of the building material, then the "keyhole" required for the deep penetration welding process cannot be formed.

Preferably, the energy introduction parameter values in the radiation impact area for a period of time immediately before directing the beam bundle to the starting point of the solidification path are specified in such a way that a reference value of the radiation power per unit area in the radiation impact area of the beam on the building material is at most 50%, preferably at most 20%, further preferably at most 10%, still further preferably at most 5%, still further preferably at most 3%, still further preferably at most 2% of the reference value for the radiation power per unit area at the starting point. Preferably, the radiation power per unit area is below 0.05 MW/cm2 before directing the beam bundle to the starting point.

As explained above, a solidification path extends between a starting point and an end point. With the procedure just described, it may be avoided that locations of the building material adjacent to the starting point are solidified outside the specified solidification path before an incidence area of the at least one beam bundle reaches the starting point. The edges of the solidified area should generally be formed with a high level of detail, which is accompanied by a precise delimitation of the solidified area in relation to unsolidified or previously solidified building material. With the described procedure it is possible to provide a clear demarcation of the solidified area compared to surrounding unsolidified building material, because the difference in the radiation power per unit area is limited. Preferably, at the most as much energy is introduced outside of the solidification path (e.g. in the turning regions already mentioned) that the building material is heated but no solidification is caused.

In particular, it is preferred that the energy introduction parameter values in the radiation impact area within a section of the solidification path adjacent to the end point are defined in such a way that a heat conduction welding process takes place when the radiation acts on the building material, wherein preferably a maximum expansion of the section corresponds to at most twenty times the maximum expansion of the radiation impact area, further preferably at most ten times, still further preferably at most five times, particularly preferably at most twice the maximum expansion of the radiation impact area.

By applying a heat conduction welding process within a section of the solidification path adjacent to the end point, it may be ensured that irregularities in the solidified building material are avoided already near the end point.

Preferably, a greater or equal maximum extension of the radiation impact area perpendicular to the direction of movement of the beam bundle is specified for the end point and/or a section of the at least one solidification path adjacent to the end point than at the other locations of the solidification path and/or a different distribution of the radiation intensity per unit area within the radiation impact area, in particular, a greater value of the ratio of the radiation power per unit area at the edge of the radiation impact area to the radiation power per unit area in the middle of the radiation impact area is specified than at the other locations of the solidification path.

A transition to a lower radiation power per unit area at the end point of the solidification path may lead to a change in the solidification width. This may be counteracted by the changes mentioned above. For example, a reduction in radiation power per unit area may simultaneously reduce the speed of movement of the radiation impact area across the building material and/or change the focal plane of the beam bundle relative to the working plane. Furthermore, the distribution of the radiation intensity in the beam bundle may be selected in such a way that at the end point and/or in a section of the solidification path adjacent to the end point a greater value of the ratio of the radiation power per unit area at the edge of the radiation impact area on the one hand to the radiation power per unit area in the middle of the radiation impact area on the other hand is present than at other locations of the solidification path. The changed distribution of the radiation intensity per unit area does not necessarily mean that an absolute value of the radiation power per unit area at the edge is higher than an absolute value of the radiation power per unit area in the middle.

Further preferably, at the end point and/or within a section of the at least one solidification path adjacent to the end point, the beam bundle in the working plane performs a periodic or irregular displacement of an amplitude which is less than five times, preferably less than three times, particularly preferably less than twice a maximum extension of the radiation impact area in the working plane.

The amplitude of the movement is in particular the maximum distance from the centre of the radiation impact area to the end point during the movement in the working plane. The measure described above may ensure a more even distribution of the radiation energy introduced into the building material, thus reducing any depressions or material accumulations at the end point of the solidification path.

Further preferably, it is specified in the second step that for a period of time immediately before directing the beam bundle to the starting point of the solidification path and/or for a period of time immediately after directing the beam bundle to the end point of the solidification path, the beam bundle is not directed onto the building material.

If the beam bundle is not directed onto the building material immediately before or after a scanning process of a solidification path, this may ensure that no building material is unintentionally solidified anywhere. For this purpose, the radiation source generating the radiation may be switched off or the beam bundle may be deflected so that it does not hit the building material. If immediately before directing the beam bundle to the starting point of the solidification path and/or immediately after directing the beam bundle to the end point of the solidification path, the beam bundle is not directed at the building material, then the case occurs in which in the area of the start and the end of a solidification path the largest temperature differences between locations of the building material to be solidified and those not to be solidified may potentially occur. However, since the radiation power per unit area supplied to the building material per unit area is already reduced at the start and/or end point of the solidification path compared to other locations of the solidification path, not such large disadvantages are to be expected with a procedure according to the invention.

Further preferably the energy introduction parameter values of the beam bundle for a period of time immediately after directing the beam to the end point of the solidification path are specified in such a way that a reference value for the radiation power per unit area in the radiation impact area of the beam on the building material is less than or equal to 50%, preferably less than or equal to 20%, even more preferably less than or equal to 10%, even more preferably less than or equal to 5% of the reference value for the radiation power per unit area at the end point.

Preferably the radiation power per unit area after directing the beam bundle to the end point is below 0.05 MW/cm².

As explained above, a solidification path extends between a starting point and an end point. With the procedure just described, it may be avoided that locations of the building material adjacent to the end point are solidified outside the specified solidification path. The edges of the solidified area should generally be formed with a high level of detail, which is accompanied by a precise delimitation of the solidified area compared to unsolidified or previously solidified building material. With the described procedure it is possible to provide a clear demarcation of the solidified area against surrounding building material. Preferably, outside of the solidification path (e.g. in the turning regions mentioned above), at most enough energy is introduced to heat the building material but not to solidify it.

Preferably, the energy introduction parameter values are specified in such a way that within the section of the solidification path adjacent to the end point the reference value for the radiation power per unit area decreases in the radiation impact area of the beam bundle.

By increasing the radiation power per unit area in a section adjacent to the starting point, a gradual transition to larger reference values for the radiation power per unit area may be ensured. Similarly, the reference value for radiation power per unit area in a section of the solidification path adjacent to the end point can be reduced. In both cases the change of the reference value for radiation power per unit area may be in steps and/or continuously (steplessly).

Preferably, the solidifying beam bundle is directed towards the solidification path in such a way that, when scanning the solidification path, the speed of movement of the radiation impact area of the beam bundle on the building material increases within the section of the solidification path adjacent to the starting point and/or decreases within the section of the solidification path adjacent to the end point.

By the described adaptation of the movement speed of the radiation impact area to the radiation power per unit area, the total amount of energy per unit area supplied to the building material may be adjusted. For example, if the movement speed of the radiation impact area is lower, it will take longer to pass across a certain location of the building material layer, so that the amount of energy introduced increases (compared to a case where a relatively higher movement speed was chosen).

Preferably, the speed is changed monotonically. For example, a continuous, particularly linear, decrease in the velocity of movement of the radiation impact area along the solidification path until the end point is reached may be specified. The same applies to an increase in speed from the starting point of the solidification path. Depending on the control unit used, the velocity may be varied according to a function specified by a control mechanism for displacing the radiation impact area. This may include short-term increases in speed as the radiation impact area moves towards the end point of the solidification path or short-term decreases in speed shortly after leaving the starting point of the solidification path. Finally, it is also possible that the velocity is changed in steps, for example after leaving the starting point of the solidification path, the velocity is first increased in steps until a maximum or predetermined target value of the velocity is reached. The speed may also be reduced in steps towards the end of the solidification path.

Further preferably the beam bundle is directed onto the solidification path in such a way that the velocity of the movement of the radiation impact area of the beam bundle in the working plane increases by at least 10%, more preferably by at least 100%, even more preferably by at least 1000% within a section of the solidification path adjacent to a starting point and/or decreases by at least 20%, more preferably by at least 50%, even more preferably by at least 80% within the section of the solidification path adjacent to the end point.

The extent to which the speed of movement of the radiation impact area is reduced towards the end point of the solidification path or increased from the starting point of the solidification path may be linked to conditions of a particular manufacturing process. It may, for example, depend on an energy introduction device used, e.g. a mirror system for deflecting laser beams, and/or the building material for which, for example, certain melting conditions must be observed.

The amount of energy per unit area introduced into the building material may be adjusted precisely, especially if the radiation power per unit area and the speed of displacement of the radiation impact area are changed together, especially simultaneously. There may be some margin for the amount of energy to be introduced for solidifying, e.g. when using metal or metal-containing or metal-based (metal content >50% by volume) powder as building material. It may therefore be sufficient if, while changing the radiation power per unit area and the speed of movement of the radiation impact area together, the amount of energy to be displaced per unit area is kept within a predetermined value range. The term "amount of energy to be introduced per unit area" refers to the pre-determined energy per unit area to be introduced into the building material to solidify it, taking into account, among other things, the absorption capacity of the building material.

Further preferably the velocity of movement of the radiation impact area of the beam bundle in the working plane within a section of the solidification path adjacent to a starting point and/or within the section of the solidification path adjacent to the end point is varied together with the reference value for the radiation power per unit area in the radiation impact area in such a way that at least at one location the percentage change of the reference value for the radiation power per unit area per unit time is greater than the percentage change of the velocity of movement per unit time.

Such an approach may provide for a continuous transition to a lower energy introduction per unit area at the beginning and end of a solidification path.

Preferably it is specified in the second step that the radiation impact area of the beam bundle is displaced from the end point of the solidification path to the starting point of another solidification path, wherein during this movement the energy introduced into the building material by the beam bundle does not solidify the same and is preferably zero. As mentioned above, the invention is advantageous, for example, where there is a transition between solidifying and non-solidifying scanning of the building material, in particular when there is a transition from one location of the building material layer to be solidified to another location to be solidified spaced therefrom, i.e. the radiation impact area of the beam bundle on the building material is displaced from one location of the building material layer to another location of the building material layer without solidification of building material being intended during this movement. For example, to avoid solidification of the building material, the radiation power per unit area may be significantly reduced during the transition to the starting point of another solidification path.

Further preferably in the second step a displacement of the at least one beam bundle along a plurality of adjacent, preferably at least locally substantially parallel solidification paths is specified in the data model. The method according to the invention can be applied in connection with hatching of areas of a building material layer. In hatching, the radiation impact area of a beam bundle is usually displaced along mutually parallel solidification paths, wherein at an end point of a solidification path, the beam is moved without solidifying building material to the starting point of a next solidification path. The movement without solidifying building material may or may not involve a reversal of the direction of movement. The solidification paths may or may not be exactly parallel to each other. It is quite possible that the solidification paths are only essentially parallel to each other.

As already mentioned in the introduction to the description, inhomogeneities caused by the switching off of the laser beam should not actually be of any concern, since any depressions ("holes") that may have been created are filled in by the application of the subsequent powder layer and the subsequent process step of selective melting. The inventors explain the problems that nevertheless arise by the fact that the powder column present across the recess or hole, which is larger than a conventional layer thickness, behaves differently during melting than the combination of powder in a newly applied layer and solidified building material in the layer below. The reason for the different melting behaviour may be a significantly lower density of the material to be melted in the hole in the underlying layer compared to already solidified material around the hole and thus a lower mass of material to be melted per unit volume. As a result, the laser penetrates the layer or underlying layers faster and deeper at the location of the hole, with the result that the hole is not completely eliminated even after the subsequent layer has been solidified.

Although the procedure according to the invention in the case just described leads already to an improvement or homogenization of the structure of the object or component, the clearest effects can be seen where, in additive manufacturing, locations where the laser power is set to zero or at least significantly reduced are superimposed in two or more directly successive layers. Such a situation may occur when end points of hatch lines are superimposed in two or more successive layers. It is precisely at these locations that the procedure according to the invention is advantageous, especially if three or more end points of hatch lines are located directly above each other, i.e. have the same position in the building plane.

In particular, if the speed of movement of the radiation impact area on the building material increases within the section of the solidification path adjacent to the starting point and/or decreases within the section of the solidification path adjacent to the end point, the beam bundle may move along a small radius of curvature when the direction is reversed. As a result, the time required for the transition to the starting point of the next solidification path may be shorter than in a case where, for example, the speed of movement of the beam bundle is reduced only after the end point and increased again to a constant target speed before the starting point of the next solidification path, whereby the incidence area of the beam on the building material usually covers a considerably longer distance. Of course, more time is needed to scan the trajectory when the radiation impact area of the beam bundle is displaced at a reduced speed. However, the direction of movement in the turning region may not be changed arbitrarily fast, so that at high speeds of the beam bundle the radius of the curve along which the beam bundle displaces when the direction is reversed is larger than at low speeds. The reduced path length during direction reversal at reduced speed may thus ultimately result in a shorter overall time for solidifying a layer of building material.

Further preferably, in the second step in the data model an energy introduction is specified in adjacent, preferably rectangular or square irradiation areas, wherein in an irradiation area an energy beam bundle is displaced across the building material in solidification paths that are essentially parallel to each other. As already mentioned, the procedure according to the invention is particularly suitable for the solidification of the building material partial area by partial area, which is widespread in the state of the art, wherein in the individual partial areas (e.g. stripes or squares or a closed cross-sectional area, which may also be irregularly shaped) a scanning by hatching takes place along solidification paths which are exactly or substantially parallel to one another. In these cases, the data model specifies an energy introduction in adjacent, preferably rectangular or square, irradiation areas, wherein a beam bundle is displaced across the building material in substantially parallel solidification paths in an irradiation area.

In an additive manufacturing method according to the invention for manufacturing a three-dimensional object, wherein the object is manufactured by means of an additive manufacturing device by applying a building material layer by layer and by solidifying the building material by supplying radiation energy to locations in each layer corresponding to the cross-section of the object in that layer, by scanning these locations with at least one beam bundle according to a set of energy introduction parameter values along a number of solidification paths, the flow of the additive manufacturing process is controlled by a control data set generated using a computer-aided method according to the invention for providing control data for an additive manufacturing device for manufacturing a three-dimensional object.

If control data provided according to the invention are used in a control data set generated for the control of an additive manufacturing process, in particular the control of a layer-by-layer additive manufacturing process, such as a layer-by-layer powder melting or sintering process, e.g. SLS or DMLS or SLM, then the component homogeneity of the object may be improved.

A device according to the invention for providing control data to an additive manufacturing device for manufacturing a three-dimensional object, wherein the object is manufactured by means of the additive manufacturing device by applying a building material layer by layer and solidifying the building material by supplying radiation energy to locations in each layer corresponding to the cross-section of the object in that layer by scanning those locations with at least one beam bundle according to a set of energy introduction parameter values along a number of solidification paths, comprises:

- a data access unit which is adapted to access computer-based model data of at least a portion of the object to be manufactured,
- a data model generation unit which is adapted to generate at least one data model of a region of a building material layer to be selectively solidified for manufacturing said at least one object portion, wherein solidification of said building material by displacing at least one beam bundle along at least one solidification path is specified in said data model,
- wherein, when directing the at least one beam bundle to the end point of the at least one solidification path, a set of energy introduction parameter values is specified which generates a reference value for the radiation power per unit area in the radiation impact area of the beam bundle on the building material which is lower than the reference value for the radiation power per unit area at other locations of the solidification path, and
- a control data providing unit which is adapted to provide control data corresponding to the at least one data model generated by the data model generating unit for generating a control data set for the additive manufacturing device.

The provision of the data model generated in the second step for the generation of a control data set may be performed by the control data providing unit itself by integrating the generated data model into a control data set for the additive manufacturing device. However, providing also includes forwarding the data model to a data processing device, which integrates the data model into a control data set, or direct forwarding to an additive manufacturing device. In particular, it is possible during a manufacturing process in the additive manufacturing device to provide it dynamically with data models for object cross-sections still to be manufactured. In particular, data models created in the second step do not have to be provided individually for an additive manufacturing process. Rather, several generated data models may be collected first and then made available in their entirety for integration into a control data set.

A device according to the invention for computer-aided control of a number of energy introduction devices of an additive manufacturing device for manufacturing a three-dimensional object by means of the same, wherein the object is manufactured by means of the additive manufacturing device by applying a building material layer by layer and by solidifying the building material by supplying radiation energy to locations in each layer corresponding to the cross section of the object in that layer by scanning those locations with at least one beam bundle according to a set of energy introduction parameters along a number of solidification paths is designed in such a way that that a solidification of the building material takes place by displacing at least one beam bundle along at least one solidification path in such a way that for the end point of the at least one solidification path a set of energy introduction parameter values is specified which causes a reference value for the radiation power per unit area in the radiation impact area of the beam bundle on the building material which is lower than the reference value for the radiation power per unit area at other locations of the solidification path.

The device for computer-aided control of a number of energy introduction devices may be implemented solely by means of software components, by a mixture of hardware and software components or even solely by means of hardware components. A device realized solely by means of software components may, for manufacturing a three-dimensional object, interact in particular with a control unit in an additive manufacturing device or be integrated in such a control unit. By means of the device for computer-aided control of a number of energy introduction devices, the component homogeneity of objects manufactured by an additive manufacturing process may be improved. In particular, the device may implement a manufacturing of objects by an additive manufacturing process on the basis of a control data set generated by means of a method according to the invention for providing control data.

An additive manufacturing device of the invention for manufacturing a three-dimensional object, wherein the object is manufactured in the additive manufacturing device by applying a building material layer by layer and by solidifying the building material by supplying radiation energy to locations in each layer corresponding to the cross-section of the object in that layer by scanning those locations with at least one beam bundle according to a set of energy introduction parameters along a number of solidification paths, comprises:

- a layer application device adapted to apply a layer of building material layer to an already existing, preferably already selectively solidified, building material layer, an energy introduction device adapted to supply radiation energy to locations of the cross-section of the object in the layer by scanning said locations with at least one beam bundle according to a set of energy introduction parameter values along a number of solidification paths, wherein the additive manufacturing device includes a device according to the invention for computer-aided control of a number of energy introduction devices of an additive manufacturing device for manufacturing a three-dimensional object by means thereof and/or is connected in terms of signal technology to a device according to the invention for computer-aided control of a number of energy introduction devices of an additive manufacturing device for manufacturing a three-dimensional object by means thereof.

An energy introduction device here may comprise a number of radiation sources for generating radiation, e.g. electromagnetic radiation or particle radiation, and a number of beam deflecting or redirecting devices connected thereto for directing the radiation onto the building material. In particular, preferably exactly one radiation impact area on the building material is associated to a beam deflector. The radiation sources may, for example, be one or more gas or solid-state lasers or any other type of laser such as laser diodes, in particular VCSELs (Vertical Cavity Surface Emitting Lasers) or VECSELs (Vertical External Cavity Surface Emitting Lasers) or a line of these lasers.

In particular, when generating the control data in the additive manufacturing device, the latter may dynamically generate data models for (partial) object cross-sections still to be manufactured during a manufacturing process by means of the data model generation unit.

A computer program according to the invention comprises program code means for carrying out all steps of a method according to the invention for providing control data for an additive manufacturing device for manufacturing a three-dimensional object when the computer program is executed by means of a data processor, in particular a data processor interacting with an additive manufacturing device.

"Interacting" here means that the data processor is either integrated into the additive manufacturing device or may exchange data with it. The implementation of the method according to the invention for the provision of control data as well as the associated device by means of software enables easy installability on different computer systems at different locations (for example, at the creator of the design of the object or at the operator of the additive manufacturing device).

BRIEF DESCRIPTION OF THE DRAWINGS

Further features and functionalities of the invention result from the description of implementation examples using the attached figures.

DETAILED DESCRIPTION OF THE EMBODIMENTS

Figure 1:
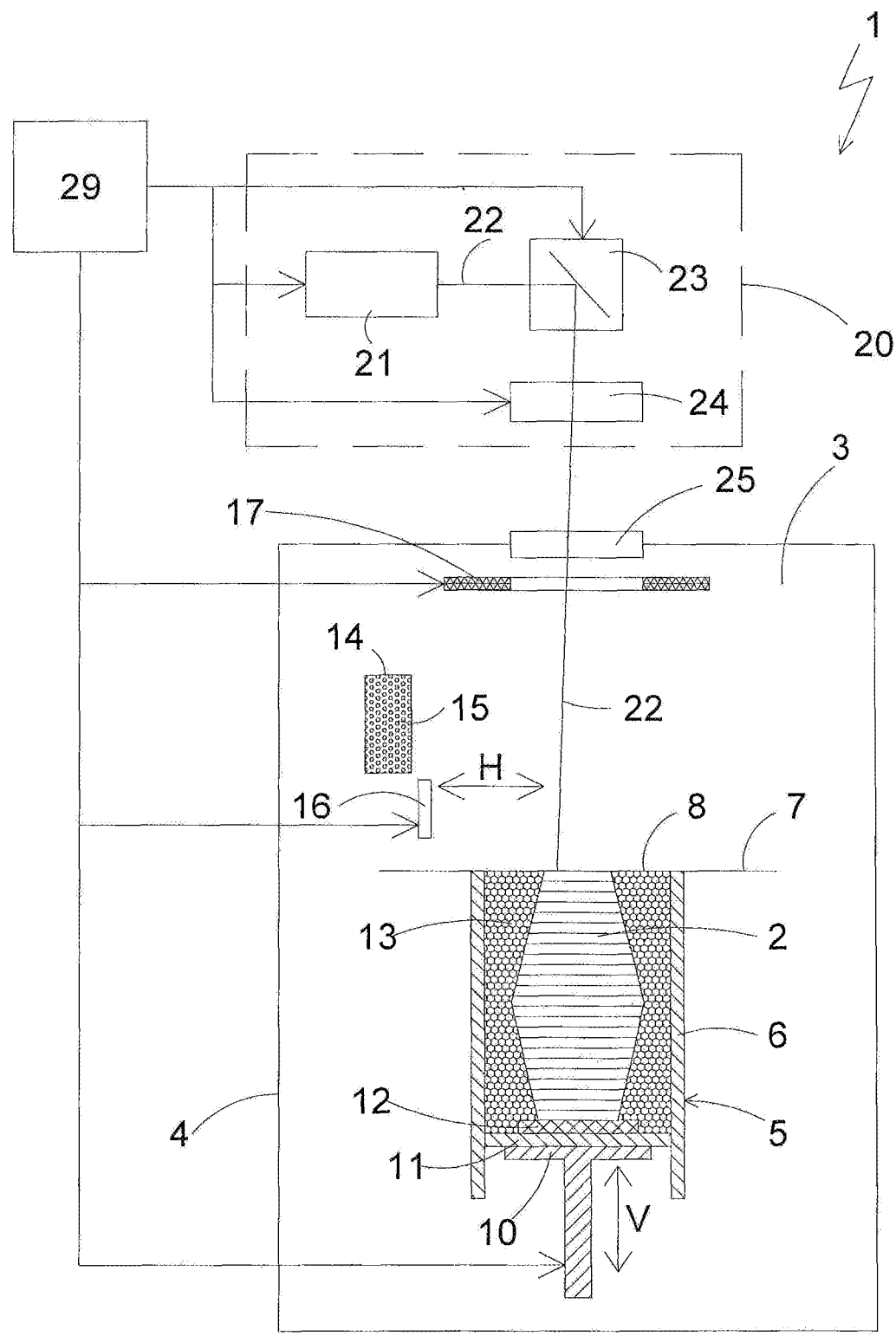
FIG. 1 shows a schematic view, partially shown in section, of an example of a device for the additive manufacturing of a three-dimensional object according to an embodiment of the invention, FIG. 2 schematically shows an example of the procedure according to the invention for solidifying a stripe-shaped partial area of an object cross section, FIG. 3a schematically shows the change in the magnitude of the velocity of a beam along the upper solidification path in FIG. 2, FIG. 3b schematically shows the change in the reference value for the radiation power per unit area of a beam along the uppermost solidification path in FIG. 2, FIG. 4a schematically shows the change in the magnitude of the velocity of a beam along the second uppermost solidification path in FIG. 2, FIG. 4b schematically shows the change in the reference value for the radiation power per unit area of a beam along the second uppermost solidification path in FIG. 2, FIG. 5 schematically shows the change of the reference value for the radiation power per unit area of a beam along a solidification path according to a variant, FIG. 6 schematically shows the change of the reference value for the radiation power per unit area of a beam along a solidification path according to another variant.

For a description of the invention, an additive manufacturing device according to the invention shall first be described in the following with reference to FIG. 1 using the example of a laser sintering or melting device.

For building an object 2, the laser sintering or laser melting device 1 comprises a process chamber or building chamber 3 having a chamber wall 4. In the process chamber 3, an upwardly open building container 5 having a container wall 6 is arranged. A working plane 7 is defined by the upper opening of the building container 5, wherein the area of the working plane 7 lying within the opening, which can be used for the construction of object 2, is called build area 8.

In the building container 5, a support 10 is arranged which is movable in a vertical direction V and to which a base plate 11 is attached which closes the container 5 downwards and thus forms its bottom. The base plate 11 may be a plate formed separately from the support 10 and attached to the support 10, or it may be integral with the support 10. Depending on the powder used and the process, the base plate 11 may also have a building platform 12 attached as a building base on which the object 2 is built. However, the object 2 may also be built on the base plate 11 itself, which then serves as a building base. In FIG. 1, the object 2 to be formed in the container 5 on the building platform 12 is shown below the working plane 7 in an intermediate state with several solidified layers, surrounded by building material 13 that has remained unsolidified.

The laser sintering or melting device 1 further comprises a storage container 14 for a building material 15, in this example a powder which can be solidified by electromagnetic radiation, and a recoater 16 which can be moved in a horizontal direction H for applying the building material 15 within the build area 8. Optionally a heating device, e.g. a radiation heater 17, which serves for heating the applied building material may be arranged in the process chamber 3. For example, an infrared radiator 17 may be provided as a radiation heater 17.

The exemplary additive manufacturing device 1 also comprises an energy introduction device 20 with a laser 21, which generates a laser beam 22, which is deflected by a deflecting device 23 and focused by a focusing device 24 via a coupling window 25, which is mounted on the upper side of the process chamber 3 in the chamber wall 4, onto the working plane 7.

In laser sintering or laser melting, for example, an energy introduction device may comprise one or more gas or solid-state lasers or any other type of laser such as laser diodes, in particular VCSELs (Vertical Cavity Surface Emitting Lasers) or VECSELs (Vertical External Cavity Surface Emitting Lasers), or a line of such lasers. The specific design of a laser sintering or melting device shown in FIG. 1 is therefore only exemplary for the present invention and may of course be modified, especially when using an energy introduction device other than the one shown. In order to make it clear that the incidence area of the radiation on the building material does not necessarily have to be very small ("point-shaped"), the term "beam bundle" is often used synonymously to "beam" in this application.

The laser sintering device 1 further includes a control unit 29, which controls the individual components of the device 1 in a coordinated manner to carry out the construction process. Alternatively, the control device may be located partly or entirely outside the additive manufacturing device. The control device may include a CPU the operation of which is controlled by a computer program (software). The computer program may be stored separately from the additive manufacturing device in a memory device, from where it may be loaded (e.g. via a network) into the additive manufacturing device, in particular into the control unit.

In operation, the control unit 29 lowers the carrier 10 layer by layer, the recoater 16 is controlled to apply a new powder layer and the deflector 23 and, if necessary, also the laser 21 and/or the focusing device 24 are controlled to solidify the respective layer at the locations corresponding to the respective object by means of the laser by scanning these locations with the laser.

All the explanations given below apply not only to laser sintering or melting devices, but also to other types of additive manufacturing devices in which thermal energy is introduced into the building material by means of radiation.

In the additive manufacturing device just described as an example, a manufacturing process takes place in such a way that control unit 29 processes a control data set.

By means of the control data set, an energy introduction device, in the case of the above laser sintering or laser melting device especially the deflecting device 23, is instructed for each point in time during the solidification process to which location of the working plane 7 radiation is to be directed. As shown in FIG. 8, a device 100 for providing control data to an additive manufacturing apparatus includes a data access unit 101, a data model generating unit 102, and a control data providing unit 103. The operation of the device 100 for providing control data is described by referring to FIG. 7 as an example.

In the device 100 shown in FIG. 8 for providing control data for an additive manufacturing device, the data access unit 101 first accesses a number, i.e. one or more, of layer data sets, each of which comprises a data model of an area of a building material layer to be selectively solidified during the manufacture, preferably the entire area of a building material layer to be solidified, which corresponds to a cross-section of an object section. In the process sequence shown in FIG. 7, this is the first step S1.

Figure 7:
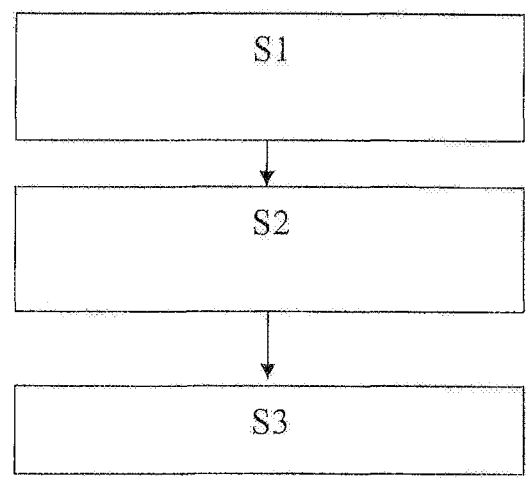
FIG. 7 illustrates the flow of a procedure for providing control data.
Figure 8:
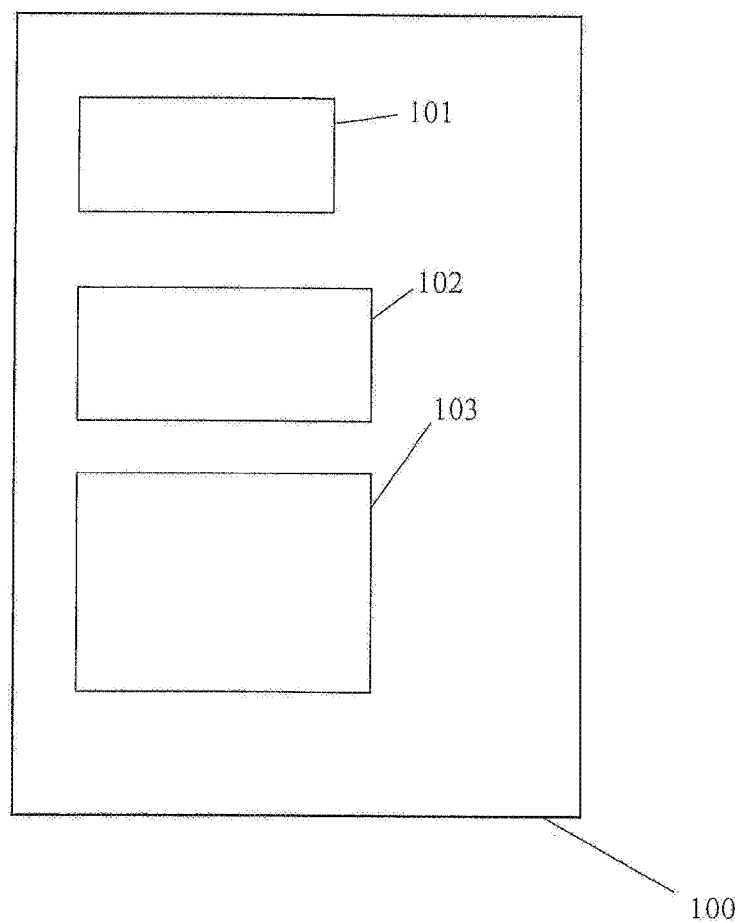
FIG. 8 shows the schematic structure of a device for providing control data.

In the second step S2 shown in FIG. 7, the data model generation unit 102 now specifies in at least one data model of the at least one object section a solidification of locations of a building material layer in a temporal sequence corresponding to the displacement of a beam bundle along a solidification path across the building material. The procedure is explained based on FIG. 2.

Figure 2:
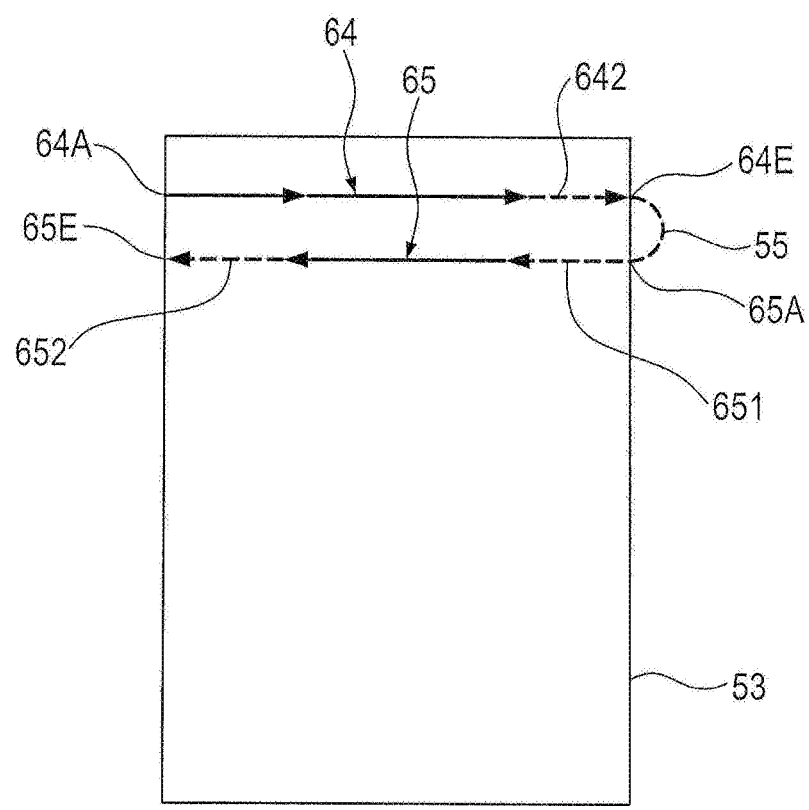

FIG. 2 shows a partial area 53 of the object cross section which is stripe-shaped in the example and is scanned solidification path by solidification path by displacing the beam bundle. For the sake of clarity only the two solidification paths 64 and 65 are shown in FIG. 2. Below these two solidification paths there are other solidification paths which, however, are not shown. On the basis of the directions of the arrows in the solidification paths, which are to illustrate the direction of movement of the radiation impact area of the beam bundle, and on the basis of the presence of the turning area 55, it can be seen that the solidification path 64 is traversed chronologically before the solidification path 65. On the solidification path 64, the starting point and the end point are designated by the reference characters 64A and 64E, respectively. On the solidification path 65, the starting point and the end point are designated with the reference characters 65A and 65E, respectively. For the solidification path 64, it is assumed for the sake of simplicity that the radiation power per unit area $\phi$ (more precisely a reference value of the same) impinging on the building material does not change over time. In contrast, in the dashed section 642 of the solidification path 64, it is specified that the reference value for the radiation power per unit area $\phi$ impinging on the building material decreases on average as the radiation exposure area moves along section 642.

Figure 3A:
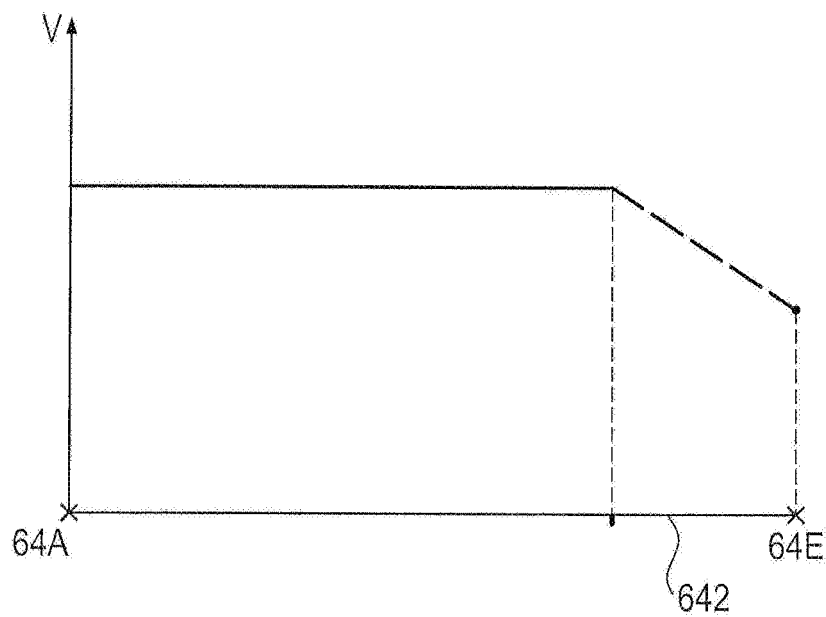
Figure 3B:
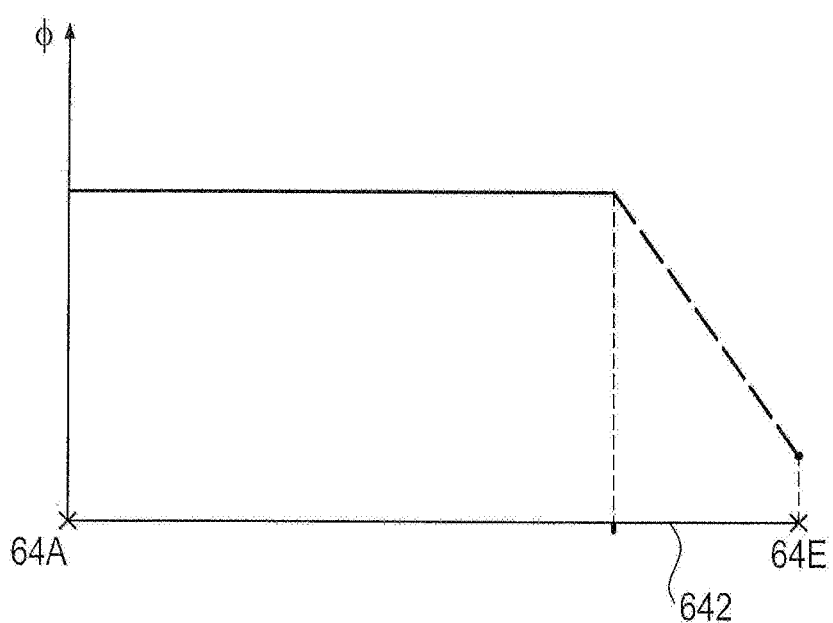

FIG. 3b shows a schematic representation of the course of a reference value for the radiation power $\phi$ per unit area impinging on the building material during the movement of the radiation exposure area along the solidification path 64. In order to allow a better assignment to the solidification path 64 shown in FIG. 2, the course of the reference value for the radiation power $\phi$ per unit area impinging on the building material is also shown as a dashed line in FIG. 3b in solidification path section 642. It can be seen that in the solidification path section 642 the reference value for the radiation power $\phi$ per unit area impinging on the building material decreases linearly towards the end 64E of the solidification path. In the example in FIG. 3b, the reference value for the radiation power $\phi$ per unit area impinging on the building material at the end 64E of the solidification path 64 is only about 20% of the reference value for the radiation power per unit area impinging on the building material at other locations of the solidification path. This means that the change in radiation power per unit area is no longer as abrupt when starting the reversal process of the direction of movement in the turning area 55 in FIG. 2. As a result, the component homogeneity at this location is improved.

After the end 64E of the solidification path has been reached, i.e. at the start of the reversal of the direction of movement, the radiation power per unit area is usually reduced to a value close to zero, e.g. by blocking or interrupting the radiation or switching off the radiation source. However, if the reduction in radiation power per unit area is sufficiently large, it is also possible to maintain the energy supply in the turning region 55, provided that the energy supply is sufficiently small to prevent solidification of the building material in the turning region. The temperature of the building material should therefore not rise in the turning region above the liquidus temperature or melting temperature or a certain temperature threshold of a phase transition (depending on the way it is to be solidified).

Although in some cases, e.g. when metal or metal-containing powder is used as a building material, it is possible not to change the speed of movement of the radiation impingement area during the reduction of the radiation power per unit area impinging on the building material towards the end of the solidification path, it is usually desirable to change the speed at the same time as changing the radiation power per unit area impinging on the building material. In other words, it is preferable to reduce the speed of movement of the beam bundle's impact area at the same time as or in temporal overlap with the reduction of the radiation power per unit area on the building material. The situation is again shown schematically in FIG. 3a. Again, for better comparability with FIG. 2, the curve of the velocity in the solidification path section 642 is shown as a dashed line.

Figure 4A:
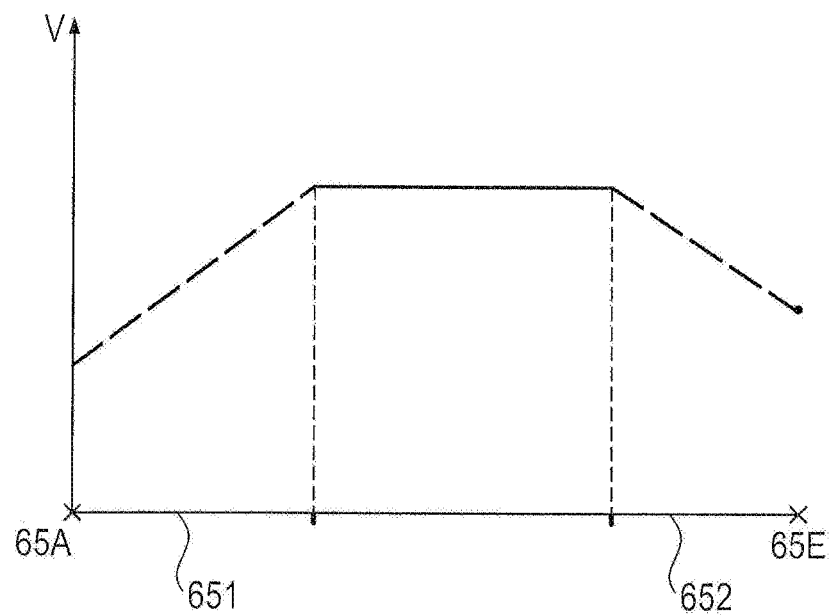
Figure 4B:
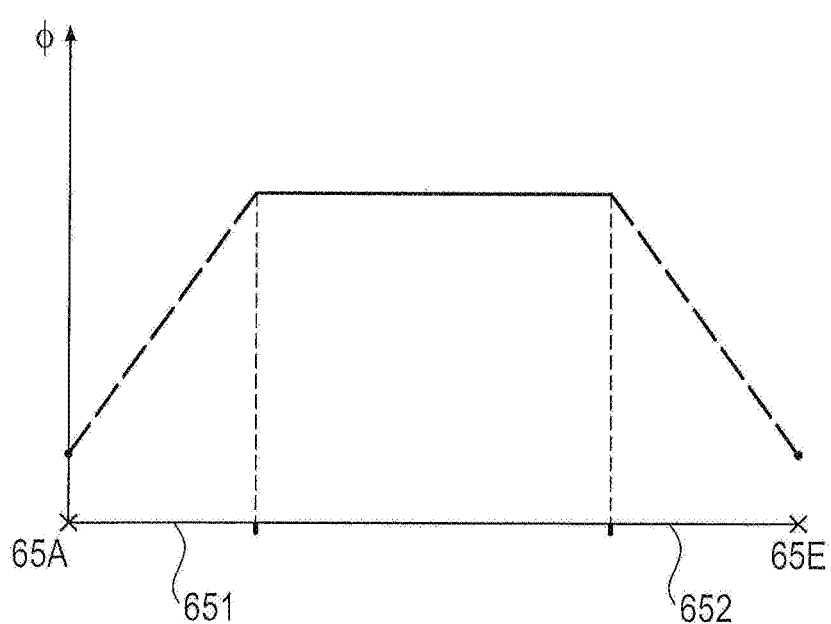

Not only at the end but also at the beginning of the solidification path the homogeneity of the object can be improved. In FIG. 2 this is illustrated by the solidification path 65. On the one hand, the solidification path 65 has a solidification path section 652, in which the reference value for the radiation power per unit area impinging on the building material is reduced towards the end of the solidification path 65E. On the other hand, it has a section 651 in which the radiation power per unit area impinging on the building material is increased when scanning the solidification path. The situation is illustrated schematically in FIG. 4b. It can be seen that the reference value for the radiation power per unit area impinging on the building material increases linearly from the beginning 65A of the solidification path starting from a starting value until a maximum value is reached, which is maintained in order to be reduced linearly again in the solidification path section 652 towards the end 65E of the solidification path 65. As already explained in conjunction with FIGS. 3a and 3b, in addition to varying the reference value for the radiation power per unit area impinging on the building material, the speed may also be varied. This means that even while increasing the reference value for the radiation power per unit area impinging on the building material in the solidification path section 651, an even energy introduction per unit area may be ensured by simultaneously increasing the speed. Preferably the velocity and/or the reference value for the radiation power per unit area impinging on the building material at the starting point 65A of the solidification path 65 is equal to the velocity and/or the reference value for the radiation power per unit area impinging on the building material at the end point 64E of the preceding solidification path 64.

After at least one data model has been generated in the second step S2 in FIG. 7, control data for the generation of a control data set are then provided by the control data providing unit 103 shown in FIG. 8. Either the at least one data model generated in the second step S2 may be provided as control information (control data) or the data model is reformatted for better integration into a control data set. The described procedure may be used for all the solidification paths within a stripe-shaped or square partial area. In addition, the procedure can be generalized to the effect that the described procedure is used whenever the beam bundle is moved from one location (the end point of a solidification path) to another location (the starting point of another solidification path) while scanning the building material layer without solidifying the building material.

Figure 9:
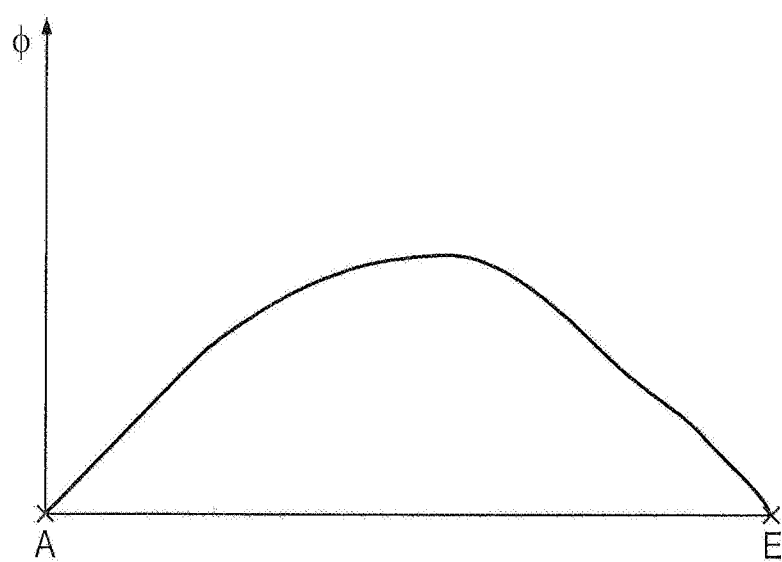
FIG. 9 shows a special implementation example of the invention.
Figure 10:
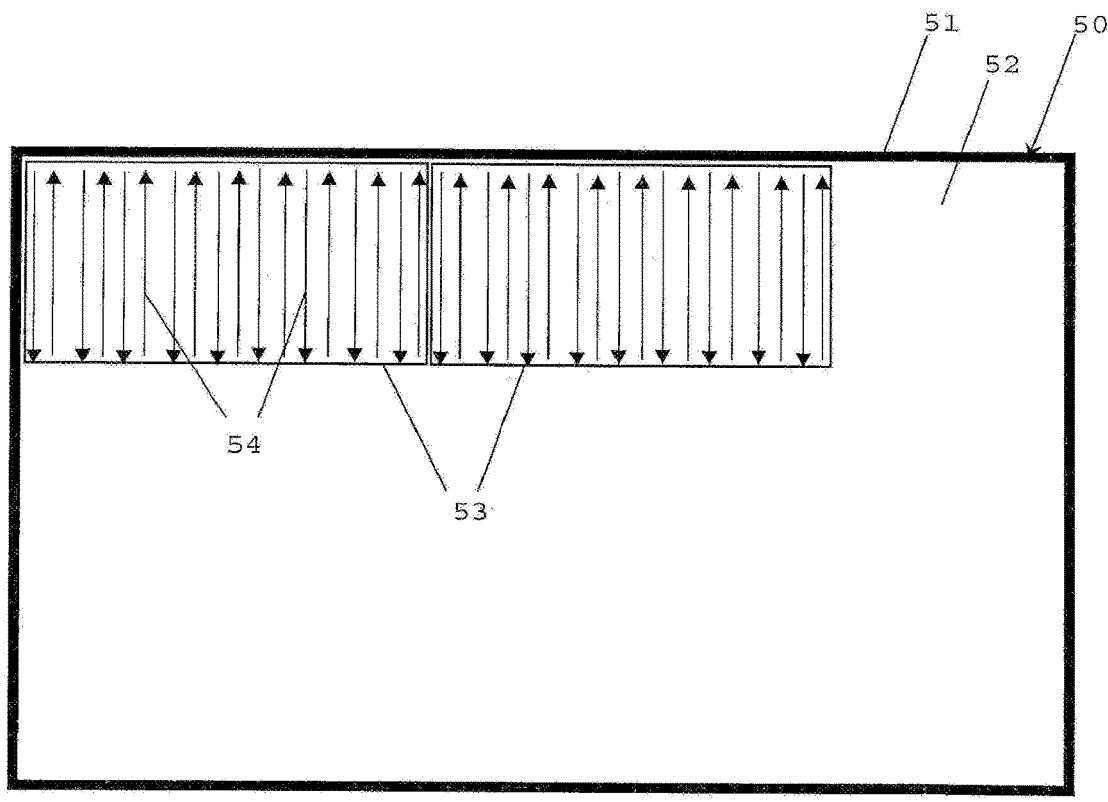
FIG. 10 shows a procedure known to the applicant for scanning an object cross-section with energy radiation, FIG. 11 serves for a further explanation of the procedure shown in FIG. 10.
Figure 11:
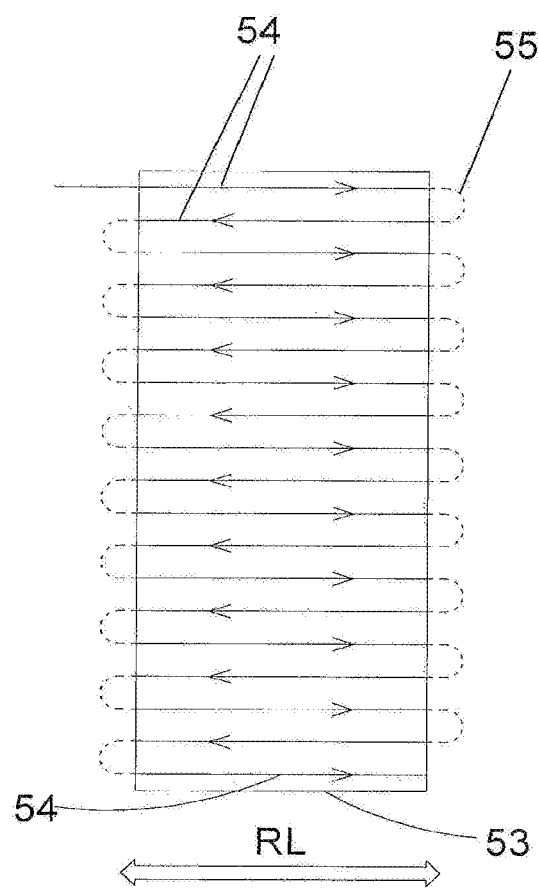

The period of time specified for reducing or increasing the radiation power per unit area impinging on the building material is not subject to any restrictions in a first approximation. The respective time period at the beginning of a solidification path and/or at the end of a solidification path correlates via the speed of movement v of the beam bundle with the length of sections 651 and 652, 642 at the beginning and end of the solidification path, respectively, in which the reference value for the radiation power per unit area impinging on the building material is varied. In the case of short solidification paths, the corresponding periods (and sections) are to be selected accordingly short, usually so short that the intended radiation power per unit area impinging on the building material can still be achieved at any location on the solidification path. Nevertheless, in the case of very short solidification paths, the time periods at the beginning and end of the solidification path may also be selected so that in the middle section of the solidification path, i.e. in the middle section relative to the direction in which the solidification path is scanned, the radiation power per unit area impinging on the building material is lower than in the case of longer solidification paths. Under certain circumstances, the increase in the reference value for the radiation power per unit area impinging on the building material per unit area along the solidification path may directly change into a decrease in the reference value for the radiation power per unit area impinging on the building material. For example, the reference value for the radiation power per unit area impinging on the building material may be approximately sinusoidal along the solidification path (only the first half wave of the sinusoid). Such a procedure is schematically illustrated in FIG. 9, where the reference signs A and E mark the beginning and end of a solidification path, respectively. Of course, the speed may be changed analogously, e.g. proportionally to the curve of the radiation power per unit area, in order to ensure the most homogeneous energy introduction possible when irradiating the solidification path. In this way, for example, an essentially constant energy introduction per unit area may be achieved or fluctuations in the energy introduction per unit area may be limited, e.g. below 15%, preferably below 5%.

Figure 5:
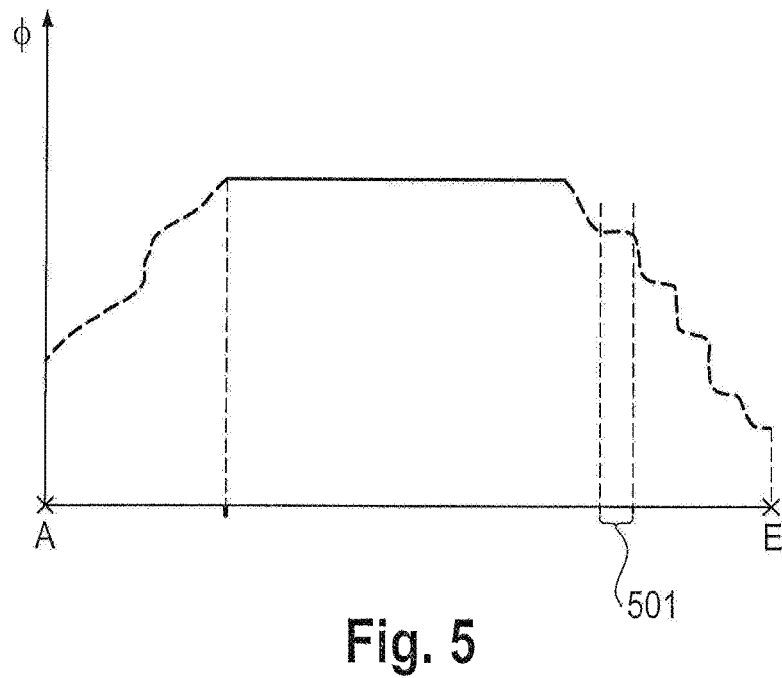
Figure 6:
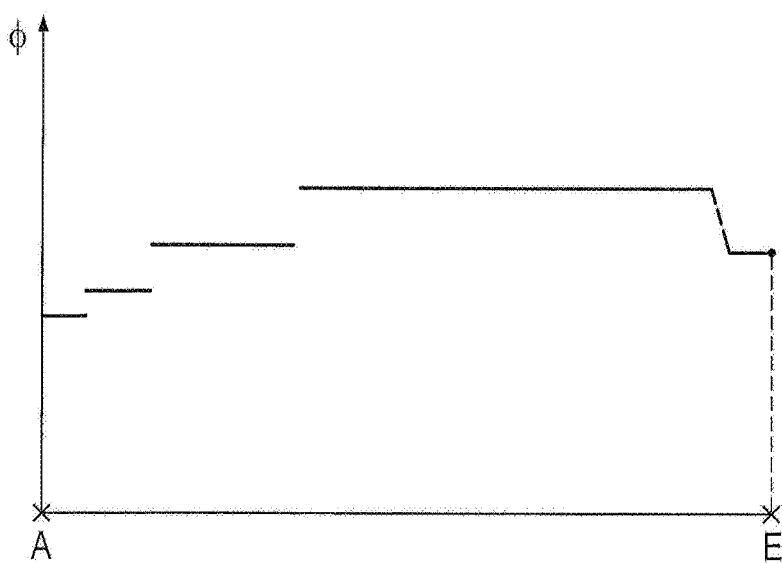

As already indicated in the previous paragraph, the velocity and the reference value for the radiation power per unit area impinging on the building material do not necessarily have to be linearly varied within the section of the solidification path adjacent to the end point and within the section of the solidification path adjacent to the start point. The change in velocity and radiation power per unit area impinging on the building material along the solidification path also depends essentially on the number of energy introduction devices used in the additive manufacturing device or the device for controlling this number of energy introduction devices. FIG. 5 shows that it is quite possible that during the lowering of the reference value for the radiation power per unit area impinging on the building material, there may even be an increase of the reference value for the radiation power per unit area impinging on the building material (see e.g. section 501 on the solidification path). Nevertheless, a tendency should be specified for the reference value for the radiation power per unit area impinging on the building material to decrease towards endpoint E, resulting in a reference value for the radiation power per unit area impinging on the building material φ at endpoint E which is lower than a reference value for a region of the solidification path which is far away from endpoint E. FIG. 6 shows that stepwise changes in the radiation power per unit area impinging on the building material are also possible. The procedure shown in FIGS. 5 and 6 can be applied in the same way to the speed. This corresponds to the operation of many control devices that send out control signals in a clocked manner, e.g. at fixed, short intervals, which may have a corresponding effect on the curve of the radiation power per unit area emitted by the radiation source and/or the speed of movement of the area exposed to the radiation.

Although the figures only ever refer to the case that in the turning regions the beam bundle is moved along an arc-shaped path to the starting point of the subsequent solidification path, the beam bundle may alternatively be moved from the end point of a solidification path to the starting point of the subsequent solidification path in a substantially straight path or in an exactly straight path, especially if the speed of movement of the radiation exposure area has already been reduced to a very low value before reaching the end point.

Finally, it should be mentioned that a device 100 according to the invention for providing control data for an additive manufacturing device may be implemented not only by software components alone, but also by hardware components or mixtures of hardware and software. In particular, interfaces mentioned in the present application do not necessarily have to be implemented as hardware components, but may also be implemented as software modules, for example, if the input or output data can be taken over from other components already implemented on the same device, or have to be transferred to another component only by software. Likewise, the interfaces may consist of hardware and software components, such as a standard hardware interface that is specially configured by software for the specific application. In addition, several interfaces may also be combined in a common interface, for example an input-output interface.

The invention claimed is:

1. A computer-aided method for providing control data to an additive manufacturing device for manufacturing a three-dimensional object, wherein the object is manufactured by the additive manufacturing device by applying a building material layer by layer and by solidifying the building material by supplying radiation energy to locations in each of a plurality of layers corresponding to a cross-section of the object in a respective one of the layers by scanning the locations with at least one beam bundle according to a set of energy introduction parameter values along a number of solidification paths, the method for providing control data comprising:

accessing computer-based model data of at least a portion of the object to be manufactured;

generating at least one data model of a region of a building material layer to be selectively solidified for manufacturing the at least one object portion, wherein the data model specifies solidification of the building material by moving at least one beam bundle along at least one solidification path, the solidification path extending from a starting point to an end point of the solidification path, and the end point being a section of the solidification path within which solidification of the building material is effected;

specifying a set of energy introduction parameter values for the end point of the at least one solidification path, the set of energy introduction parameter values causing a reference value for the radiation power per unit area in the radiation impact area of the beam bundle on the building material to be lower than the reference value for the radiation power per unit area at other locations of the solidification path; and providing control data corresponding to the at least one data model generated in the step of generating, the control data generating a control data set for the additive manufacturing device.

2. The method according to claim 1, wherein the reference value for the radiation power per unit area in the radiation impact area on the building material at the end point of a solidification path is less than or equal to 50% of the reference value for the radiation power per unit area at the other locations of the solidification path.

3. The method according to claim 1, wherein the energy introduction parameter values in the radiation impact area at the end point of a solidification path are determined in such a way that a heat conduction welding process takes place when the radiation acts on the building material, wherein a deep penetration welding process takes place at at least one other location of the solidification path when the radiation acts on the building material.

4. The method according to claim 3, wherein the energy introduction parameter values in the radiation impact area within a section of the solidification path adjacent to the end point are determined in such a way that a heat conduction welding process takes place when the radiation is applied to the building material, wherein a maximum extension of the section corresponds to at most twenty times the maximum extension of the radiation impact area.

5. The method according to claim 1, further comprising specifying a greater or equal maximum extension of the radiation impact area perpendicular to the direction of movement of the beam bundle than at the other locations of the solidification path and/or a different distribution of radiation intensity per unit area within the radiation impact area for the end point and/or a section of the at least one solidification path adjoining the end point.

6. The method according to claim 1, further comprising performing a periodic or irregular movement in the working plane having an amplitude which is less than five times a maximum extension of the radiation impact area in the working plane at the end point and/or within a section of the at least one solidification path adjacent to the end point.

7. The method according to claim 1, wherein the energy introduction parameter values of the beam bundle are specified for a period immediately after the beam is directed to the end point of the solidification path, so that a reference value for the radiation power per unit area in the radiation impact area of the beam bundle on the building material is less than or equal to 50% of the reference value for the radiation power per unit area at the end point.

8. The method according to claim 1, wherein the energy introduction parameter values are specified in such a way that within the section of the solidification path adjacent to the end point the reference value for the radiation power per unit area decreases in the radiation impact area of the beam bundle.

9. The method according to claim 1, wherein the beam bundle is directed onto the solidification path so that the speed of movement of the radiation impact area of the beam bundle in the working plane within a section adjacent to an initial point of the solidification path increases by at least 10% and/or decreases within the section of the solidification path adjacent to the end point by at least 20%.

10. The method according to claim 1, wherein the speed of movement of the radiation impact area of the beam bundle in the working plane within a section of the solidification path adjacent to a starting point and/or within the section adjacent to the end point of the solidification path is varied together with the reference value for the radiation power per unit area in the radiation impact area in such a way that at least at one location the percentage change in the reference value for the radiation power per unit area per unit time is greater than the percentage change in the speed of the movement per unit time.

11. An additive manufacturing method for the manufacturing of a three-dimensional object, wherein the object is manufactured by an additive manufacturing device by applying a building material layer by layer and by solidifying the building material by supplying radiation energy to locations in each of a plurality of layers corresponding to a cross-section of the object in a respective one of the layers by scanning the locations with at least one beam bundle according to a set of energy introduction parameter values along a number of solidification paths,
wherein the flow of the additive manufacturing process is controlled by a control data set generated using a method according to claim 1.

12. A device for providing control data for an additive manufacturing device for manufacturing a three-dimensional object, wherein the object is manufactured by the additive manufacturing device by applying a building material layer by layer and by solidifying the building material by supplying radiation energy to locations in each of a plurality of layers corresponding to a cross-section of the object in a respective one of the layers by scanning the locations with at least one beam bundle according to a set of energy introduction parameter values along a number of solidification paths, wherein the device for providing control data comprises:
a data access unit adapted to access computer-based model data of at least a portion of the object to be manufactured;
a data model generation unit adapted to generate at least one data model of a region of a building material layer to be selectively solidified for manufacturing the at least one object portion, wherein the data model specifies solidification of the building material by moving at least one beam bundle along at least one solidification path, the solidification path extending from a starting point to an end point of the solidification path, and the end point being a section of the solidification path within which solidification of the building material is effected, wherein, when directing the at least one beam bundle onto the end point of the at least one solidification path, a set of energy introduction parameter values is specified which generates a reference value for the radiation power per unit area in the radiation impact area of the beam bundle on the building material which is lower than the reference value for the radiation power per unit area at other locations of the solidification path; and
a control data providing unit adapted to provide control data corresponding to the at least one data model generated by the data model generating unit for generating a control data set for the additive manufacturing apparatus.

13. A device for computer-aided control of a plurality of energy introduction devices of an additive manufacturing apparatus for manufacturing a three-dimensional object,
wherein the object is manufactured by the additive manufacturing apparatus by applying a building material layer by layer and by solidifying the building material by supplying radiation energy to locations in each of a plurality of layers corresponding to a cross-section of the object in a respective one of the layers by scanning the locations with at least one beam bundle according to a set of energy introduction parameters along a number of solidification paths, a solidification path extending from a starting point to an end point of the solidification path, and the end point being a section of the solidification path within which solidification of the building material is effected,
wherein the device is adapted to solidify the building material by moving at least one beam bundle along at least one solidification path so that a set of energy introduction parameter values is specified for the end point of the at least one solidification path, which generates a reference value for the radiation power per unit area in the radiation impact area of the beam bundle on the building material which is lower than the reference value for the radiation power per unit area at other locations of the solidification path.

14. An additive manufacturing device for manufacturing a three-dimensional object by applying a building material layer by layer and by solidifying the building material by supplying radiation energy to locations in each of a plurality of layers corresponding to the cross-section of the object in a respective one of the layers by scanning the locations with at least one beam bundle according to a set of energy introduction parameters along a number of solidification paths, the additive manufacturing device comprising
a layer application device adapted to apply a layer of building material to an already existing building material layer; and
an energy introduction device adapted to supply radiation energy to the locations corresponding to the cross-section of the object in a layer by scanning the locations with at least one beam bundle according to a set of energy introduction parameter values along a number of solidification paths,
wherein the additive manufacturing device comprises a device according to claim 13 and/or is connected to a device according to claim 13 in terms of signal technology.

15. A computer program comprising program code means for executing all the steps of a method according to claim 1 when the computer program is executed by means of a data processor.

* * * * *